United States Patent [19]

Ginter, Jr. et al.

[11] 4,376,668

[45] Mar. 15, 1983

[54] APPARATUS FOR AND METHOD OF MAKING V-BELTS

[76] Inventors: Tom Ginter, Jr., Box 193, Clearfield, Ky. 40313; Harold E. Hunt, General Delivery, Meta, Ky. 41501

[21] Appl. No.: 328,338

[22] Filed: Dec. 7, 1981

[51] Int. Cl.³ .................... B29C 27/06; B32B 7/08; B65H 69/06

[52] U.S. Cl. ................................ 156/92; 156/139; 156/159; 156/258; 156/304.3; 156/304.5; 156/304.6; 156/502; 156/583.1; 156/583.9

[58] Field of Search ................. 156/92, 137, 139, 140, 156/159, 258, 304.3, 304.5, 304.6, 502, 583.1, 583.9

[56] References Cited

U.S. PATENT DOCUMENTS

| | | | |
|---|---|---|---|
| 2,718,255 | 9/1955 | Levin | 156/502 |
| 2,778,420 | 1/1957 | Simon | 156/502 |
| 3,101,290 | 8/1963 | Paul | 156/159 |
| 3,546,054 | 12/1970 | Ross | 156/159 |
| 3,895,990 | 7/1975 | Josteit | 156/304.5 |
| 4,207,135 | 6/1980 | Pavano | 156/304.5 |

Primary Examiner—Michael G. Wityshyn
Attorney, Agent, or Firm—Karl W. Flocks; Sheridan Neimark

[57] ABSTRACT

An apparatus for making V-belts comprising a base member, a cover for the base member, a channel-like guide means carried by the base member for receiving a length of belting from a supply, first slot means cooperating with said guide means for receiving and guiding a cutting means to cut a predetermined length of said belting required to form a closed loop of said belting, second slot means cooperating with said guide means for receiving and guiding a cutting means in making a slot in each free end of said belting for receiving a web-like splice element adapted to bridge the free ends of said predetermined length of belting to form said loop, and heating means carried by said apparatus for vulcanizing the free ends of the predetermined length of belting to form a splice between the free ends of the belting. The method which comprises cutting a predetermined length of belting from a supply of V-belting, forming a slot in each free end of the predetermined length of belting, positioning a web-like splice element in bridging relation to said free ends, and vulcanizing said free ends and said splice element whereby to provide a strong and secure spliced joint between said free ends. In the preferred embodiment, a reinforcing strap made of a suitable material such as nylon is secured to the outer surface of the two free ends in bridging relation thereto by fastening means which pass into the belting and through the one or more splice elements.

16 Claims, 9 Drawing Figures

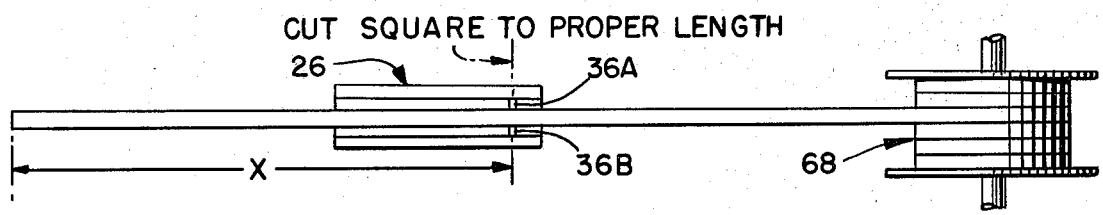
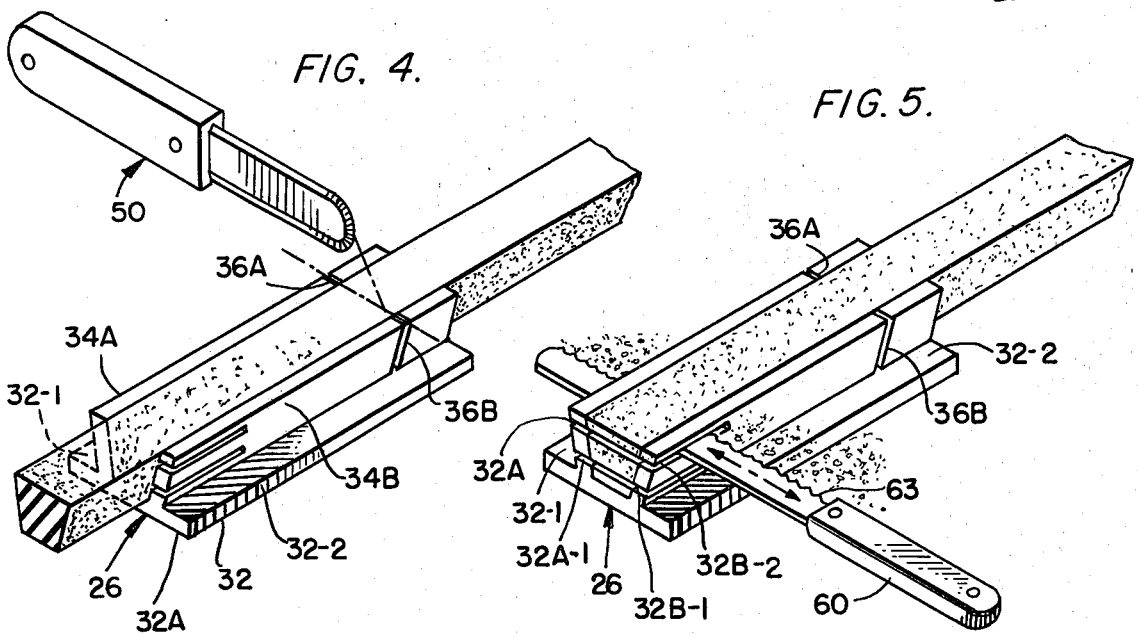
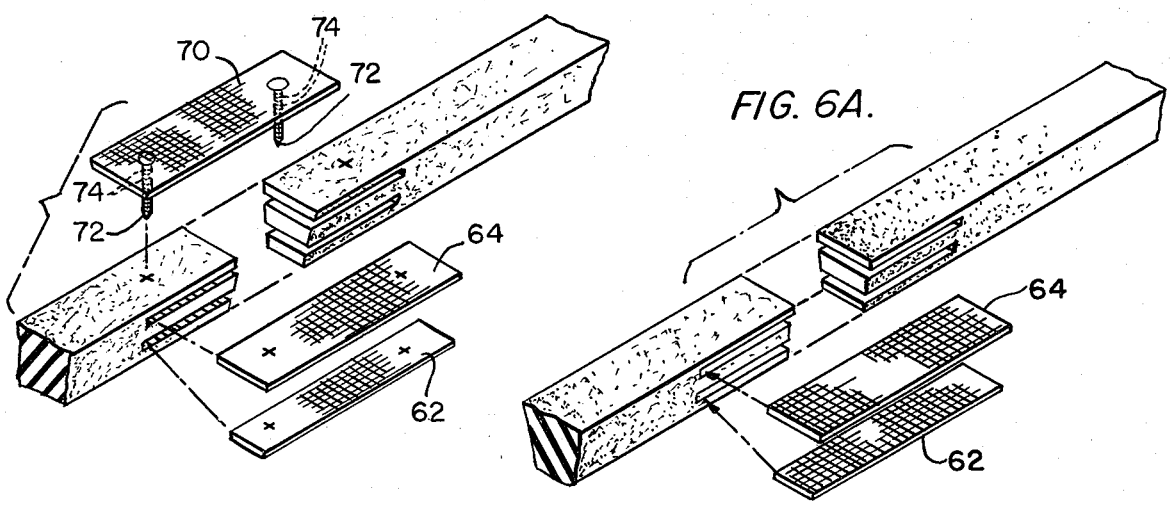

APPARATUS FOR AND METHOD OF MAKING V-BELTS

FIELD OF THE INVENTION

This invention relates to an apparatus for and a method of making V-belts, such as those used as automobile fan belts, for example, and more particularly to an apparatus for and a method of making V-belts which is particularly suitable for use by automotive service stations, garages, parts stores, or the like, and which permits a V-belt of the required dimensions to be made when needed from a continuous length of belting, whereby to avoid the necessity of stocking a large supply of V-belts of various sizes by the service station or the like.

BACKGROUND OF THE INVENTION

1. Description of the Prior Art

Automotive vehicles are always provided with one or more V-belts for such purposes as driving the fan of the vehicle and/or for driving other belt-driven apparatus on the automotive vehicle. Because such V-belts come in a large variety of lengths and cross-sectional sizes, it is necessary for the average automotive service station, repair shop, or the like, to keep a large selection of different sizes of V-belts in stock, which is necessarily expensive to do. Furthermore, even if the automotive service station does maintain a large supply of various sizes of the belts in stock, there is always the possibility that the particular size of the belt required will be out of stock.

STATEMENT OF THE INVENTION

Accordingly, it is an object of the present invention to provide an apparatus for and a method of making V-belts from a supply of continuous V-belt material which is particularly adapted for use by automotive service stations or garages, parts stores, or the like, and which avoids the necessity of stocking a large number of sizes and cross-sectional shapes of V-belts in the service station or other repair facility.

It is another object of the present invention to provide a portable V-belt splicing and vulcanizing machine particularly suitable for use by automotive service stations or garages, parts supply stores, or the like, which permits manufacture of a closed-loop V-belt of a proper length and cross-sectional shape for a particular requirement and with the ends of the length of belting which define the closed loop being spliced together and vulcanized by the splicing and vulcanizing apparatus of the invention.

It is a further object of the invention to provide a kit for making, as required, V-belts of a required length and cross-sectional dimension from a continuous length of belting from a suitable supply source such as a reel, for cutting the V-belt to the predetermined proper length from the continuous supply, for making slots in the free ends of the predetermined legnth of V-belt to receive joining or splicing webs in the abutting free ends, and for vulcanizing the abutting free ends with the joining or splicing webs therebetween to provide a strong and secure spliced joint between the two ends of the V-belt.

It is still a further object of the invention to provide a method of making a V-belt loop from a length of V-belting in which the free ends of the belting are joined by and bridged by one or more web-like splice elements which are recieved in cooperating slots in the free ends of the belting, and in which a reinforcing strap is secured to the outer surface of the two free ends of the belting in bridging relation thereto, the reinforcing strap being secured to the free ends by fastening means which pass into the belting and through the one or more web-like splice elements.

SUMMARY OF THE INVENTION

In achievement of these objectives, there is provided in accordance with the invention an apparatus for making V-belts comprising a base member, a cover for said base member, said cover being mounted on said apparatus for movement selectively into closing or opening relation to said base member, a guide means carried by said base member for receiving a length of belting from a supply, first means cooperating with said guide means for receiving and guiding a cutting means to cut a predetermined length of said belting required to form a closed loop of said belting, second means cooperating with said guide means for receiving and guiding a cutting means in making a slot in each free end of said belting for receiving a web-like splice element adapted to bridge the free ends of said predetermined length of belting to form said loop, and heating means carried by said apparatus for vulcanizing the free ends of said predetermined length to form a splice between said free ends. The apparatus may be used in practicing the method of the invention which method comprises cutting a predetermined length of belting from a supply of V-belting, said belting having a substantial content of a rubber-like material, forming a slot in each free end of the predetermined length of belting, positioning a web-like splice element in bridging relation to said free ends, and vulcanizing the region of said predetermined length which includes said free ends and said splice element whereby to provide a strong and secure spliced joint between said free ends.

In the preferred form of the V-belt, the spliced connection between the two free ends of the V-belt is reinforced and strengthened by the use of a strap element of nylon or the like which is secured to the corresponding outer surfaces of the two free ends in bridging relation thereto in the joint region. The strap element is suitably secured to the V-belt by nails or the like which extend into the belting and through the web-like splice element or elements which bridge the abutting free ends of the belting.

Further objects and advantages of the invention will become apparent from the following description taken in conjunction with the accompanying drawings in which:

BRIEF DESCRIPTION OF THE DRAWINGS

FIG. 3 is a diagrammatic view showing the method of cutting a predetermined length of the belting from the supply of V-belt material, preparatory to forming the V-belt in the machine of FIGS. 1 and 2;

FIG. 4 is a perspective view showing the method of cutting the required length of V-belt material, showing the belt channel which holds the V-belt material during the cutting operation, and the cutting tool which is used in making the cut;

FIG. 5 is a perspective view showing the method of cutting the slots in the free ends of the length of V-belt material for receiving the fiber webs which join the free ends to form the splice between the free ends;

FIG. 6 is a perspective exploded view showing the two free ends of the length of V-belt material having the slots in each end for receiving the joining or splicing fiber webs, showing the fiber webs which are received in the slots of the two free ends to form the splice between the free ends, and also showing the reinforcing strap which is secured to the outer surface of the two abutting ends of the belt to reinforce the joint;

FIG. 6a is a fragmentary exploded view generally similar to FIG. 6 but showing a modified form of V-belt loop which does not use the reinforcing strap secured to the outer surface of the two abutting ends of the belt;

DESCRIPTION OF THE PREFERRED EMBODIMENT

Figure 1:
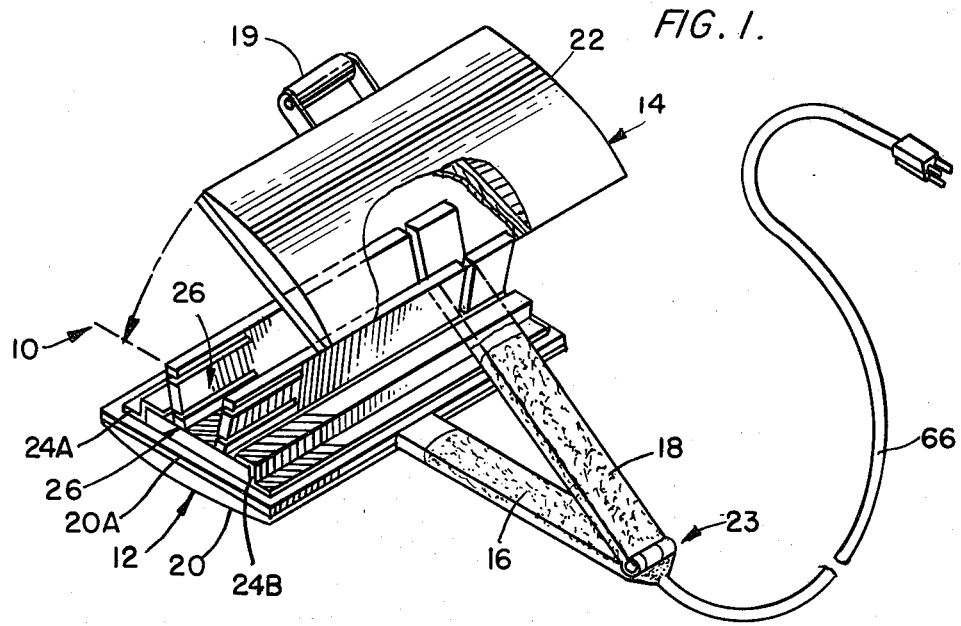
FIG. 1 is a perspective view of a portable V-belt splicing and vulcanizing machine in accordance with the invention, shown with the upper or cover section or the machine in open position.

Referring now to the drawings and more particularly to FIG. 1, the portable vulcanizing and splicing machine for V-belts is generally indicated at 10 and comprises a pair of hingedly mounted lower and upper sections respectively generally indicated at 12 and 14. The respective lower and upper sections 12 and 14 are provided with support arms 16 and 18 respectively. Lower section 12 includes a base member 20 at the outer end of the lower support arm 16; and upper section 14 includes a head or cover member 22 which lies at the outer end of upper support arm 18. The respective lower and upper handle members 16 and 18 are connected to the corresponding base member 20 and to head or cover member 22 substantially at the midpoint of the length of the respective members 20 and 22. The two support arms 16 and 18 are hingedly connected together by a hinge generally indicated at 23 and defined by cooperating hinge elements which are secured to the respective handle members 16 and 18. Support arms 16, 18 may be made of a suitable plastic or other suitable material, with the handles preferably having a heavy rubberized coating thereon to provide a suitable electrical and thermal insulation. The forward end of cover 19 is provided with a handle 19 to permit raising or lowering cover 22 about the axis of hinge 23.

As best seen in the view of FIG. 1, the upper surface of 20A of lower base member 20 is provided with a pair of parallel laterally spaced guide members indicated at 24A and 24B, respectively, which extend for substantially the entire length of the upper surface 20A. Each of the respective guide members 24A, 24B is provided with a laterally inwardly facing portion of L-shaped cross section, the two portions of L-shaped cross-section defining laterally spaced guide slots adapted to slidably receive the belt channel member generally indicated at 26 (FIG. 2), which serves as a combined cutting guide and vulcanizing mold for the V-belting which is to be formed into the fan belt or the like.

The upper surface 20A of base member 20 is provided with a plurality of electrical contact points 28 which are adapted to cooperate with a corresponding electrical contact points 30 in the bottom surface 32A of base 32 of belt channel 26 to provide electrical energization of heating elements (not shown) in the vertical walls of belt channel 26 for vulcanization of the spliced joint between the free ends of the V-belt. Cover member 22 of the apparatus 10 is also provided with heating elements which provide heat for the vulcanizing operation. The heating elements of apparatus 10 are connected to electrical power through an electrical connection cord 66.

Figure 2:
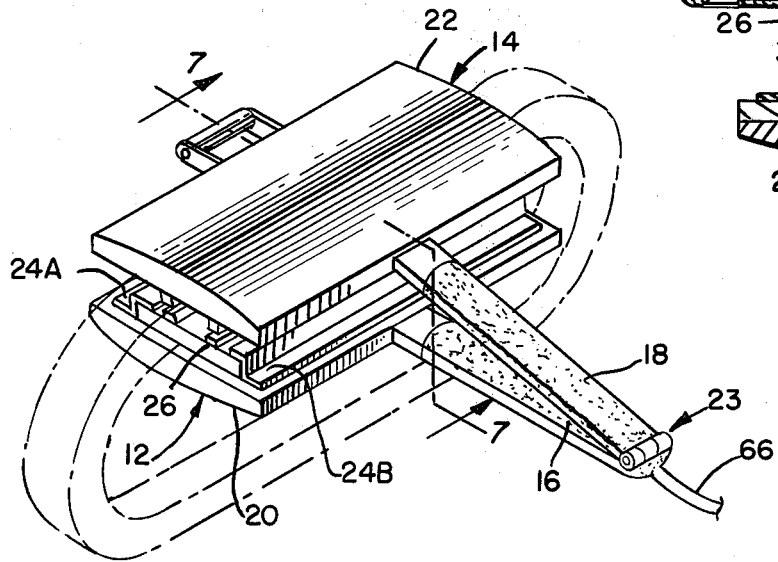
FIG. 2 is a perspective view of the machine of FIG. 1 with the upper or cover section of the machine in closed position, and with a loop of the V-belt material shown in phantom in the machine for the vulcanizing operation.
Figure 7:
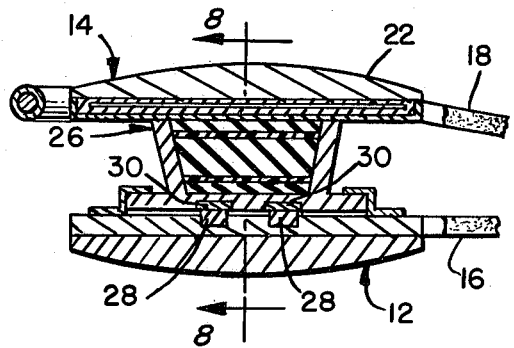
FIG. 7 is a view in transverse section of the V-belt splicing and vulcanizing machine taken along line 7—7 of FIG. 2.

As best seen in the views of FIGS. 2 and 4, the belt channel member generally indicated at 26 comprises a normally horizontal base portion 32. Belt channel 26 also comprises a pair of diverging walls 34A and 34B which are adapted to receive the V-belt therebetween during the cutting and vulcanizing operations to be described hereinafter. The lower end of each of the diverging walls 34A, 34B extends upwardly from a location which lies laterally inwardly of the respective parallel outer longitudinal edges of base member 32, whereby to define oppositely disposed flange portions 32-1 and 32-2, respectively, of the base member 32 which are adapted to slidably engage guide members 24A and 24B carried by the upper surface 20A of base member 20 of lower section 12 of the splicing and vulcanizing machine 10.

Contiguous the right-hand end thereof, as viewed in FIG. 2, each of the respective diverging walls, 34A, 34B of belt channel 26 is provided with a corresponding cross-cut 36A, 36B, the two cross-cuts 36A, 36B lying in a common plane with each other transverse of the longitudinal axis of belt channel 26, whereby to define in effect a "miter-box" which permits cutting of the belt material from a roll supply of V-belting to a proper length for formation into a V-belt loop of predetermined length, as well be explained more fully hereinafter.

Also, at the opposite end of belt channel 26, each of the respective belt channel walls 34A, 34B is provided with a pair of vertically spaced longitudinally extending slots respectively indicated at 34A-1 and 34A-2 in the case of the wall 34A; and at 34B-1 and 34B-2 in the case of belt channel sidewall 34B. Each of the respective slots 34A-1, 34A-2, 34B-1, and 34B-2 extends inwardly longitudinally from the outer end of the respective diverging sidewall 34A or 34B, as the case may be.

The longitudinally-extending slots 34A-1, 34A-2, 34B-1, 34B-2 just described are adapted to receive the edge of a saw-like cutting member 60 (FIG. 5) which is used to make slots in each of the free ends of the V-belt prior to its being joined by vulcanizing to receive insert joining or splicing fiber webs which bridge the joing between the two free ends of the V-belt which is being formed into a fan belt, drive belt, or the like.

Belt channel member 26 comes in different cross-sectional sizes to receive V-belts of different cross-sectional areas, but due to the laterally inward spacing of the lower ends of the diverging side walls 34A, 34B relative to base member 26 of belt channel member 26 and the opposite flange portions 32-1 and 32-2 thereby provided on base member 32, different belt channels 26 adapted to receive V-belts of different transverse cross-sectional dimensions can be interchangeably received in the same guide members 24A, 24B of base member 20.

DESCRIPTION OF OPERATION

It is assumed that a channel member 26 having the required cross-sectional dimensions for the particular V-belt cross-sectional area desired has been inserted in and is positioned in the guide members 24A, 24B of base member 20.

As best seen in the diagrammatic sketch of FIG. 2, the first step in making a V-belt is to pay out from reel 68 a predetermined required length "X" of the V-belt 70 as shown in FIG. 3, the distance X being measured lengthwise from the aligned slots 36A, 36B of belt channel 26.

The V-belt 70 is made with a substantial content of rubber or of rubber-like material, whereby the free ends of the length "X" of the V-belt are adapted to be joined in a vulcanizing operation, as will be described hereinafter.

When the predetermined length X has been measured out, the knife 50 of FIG. 4 is then used to make a cross-cut transverse of the longitudinal axis of the belting to cut off the required length X of belting for fabrication into a V-belt having a loop of the required length.

After the required length of V-belt has been cut in the manner just described, one free end of the length of V-belt which has been cut is oriented in belt channel 26 with the end surface thereof flush with the outer end of channel 26 contiguous the slots 34A-1, 34A-2, 34B-1, 34B-2. The saw-like cutting member 60 is then inserted first in one pair of opposite guide slots, such as the upper guide slots 34A-2 and 34B-2 at opposite lateral sides of belt channel 26, and cutting member 60 is moved along the length of guide slots 34A-2 and 34B-2 with a sawing action, the teeth 63 of the saw-like member removing the material from the belting to form a slot extending for the entire lateral width of the V-belt and for a longitudinal distance corresponding to the longitudinal length of the guide slots 34A-2, 34B-2, etc. In a similar manner, the cutting member is also inserted in the other pair of guide slots, namely, the lower guide slots 34A-1 and 34B-1 at opposite lateral sides of the belt channel, cutting member 60 being operated with a sawing action in the manner previously described to form a slot for receiving lower splice element 62.

A slot is thus produced in the upper or wider portion of the V-belt and also in the narrower or lower portion of the V-belt. After the slots have been made in the upper and lower portions at one free end of the V-belt as just described, the free end of the belt which has just been slotted in the manner just described is removed from belt channel 26 and the opposite free end of the belt which has not yet been slotted is then inserted in belt channel 26 and the slotting operation just described is then repeated on the opposite end of the belt, so that when both free ends of the V-belt have been slotted in the manner just described in belt channel 26, the two facing free ends of the belt then appear as best seen in the view of FIG. 6.

Two splice elements are provided, including a lower splice element 62 and an upper splice element 64. Splice elements 62 and 64 are preferably formed of a material such as nylon fibers having a rubber-like or elastomeric material bonded to the surfaces thereof. Due to the tapered cross-section of the V-belt, the lateral width of the lower splice element 62 is less than that of the upper splice element 64. However, both splice elements 62 and 64 are of equal length in the direction of the longitudinal axis of the V-belt.

With the two free ends of the V-belt in substantially abutting relation to each other, the laterally narrower splice element 62 is inserted into bridging relation to the two slots at the lower portion of the respective abutting free ends of the V-belt; and, similarly, the laterally wider second splice element 64 is inserted into bridging relation to the longitudinal slots of the two facing and abutting free ends of the V-belt at the upper ends of the facing ends of the V-belt.

The various cutting operations which are performed on the free ends of the V-belt, including the transverse cut through the guide slots 36A, 36B, and also the cutting operation shown in FIG. 5 which provides the longitudinal slots which receive the splice elements 62, 64 at the respective free ends of the V-belt may all preferably be performed with the belt channel 26 positioned in the guide members 24A, 24B of base member 20 of the splicing and vulcanizing machine 12. However, it is also possible that the transverse cut and the longitudinal cuts just described can be performed with the belt channel 26 removed from the splicing and vulcanizing machine 12, and before belt channel 26 is inserted into guide members 24A, 24B.

After the longitudinal slots have been formed in the two free ends of the V-belt, it may be preferable to insert the splice elements 62 and 64 in the two free ends with the V-belt removed from belt channel 26, and then to reposition the V-belt into the belt channel 26 for the vulcanizing operation.

In the preferred form of the V-belt loop shown in FIG. 6, the spliced connection between the two free ends of the V-belt is reinforced and strengthened by the use of a strap element 70 made of nylon or other suitable material which is secured to the corresponding outer surface of the two free ends in bridging relation thereto in the joint region. The strap element 70 is suitably secured to the V-belt by nails 72 or the like which extend into the belting and through the web-like splice elements 62, 64 which bridge the abutting free ends of the belting. The nails 72 may be made of a suitable material such as rigid nylon or metal. Nails 72 are preferably provided with serrated portions 74 which provide a strong connection between the nails and the material of the belting and of the web-like splices 62, 64, and which also resist removal of the nails.

The V-belt loop is vulcanized with the strap member 70 secured to the free ends of the loop and during the vulcanizing step the strap member 70 becomes bonded to the V-belting.

There is shown in FIG. 6A a modified embodiment of a V-belt loop which is similar to the V-belt loop shown in FIG. 6 but omits the use of the bridging strap 70 shown in the preferred form of FIG. 6. The V-belt loop shown in FIG. 6A is formed in the same way as the loop shown in FIG. 6 except for the omission of strap 70.

Figure 8:
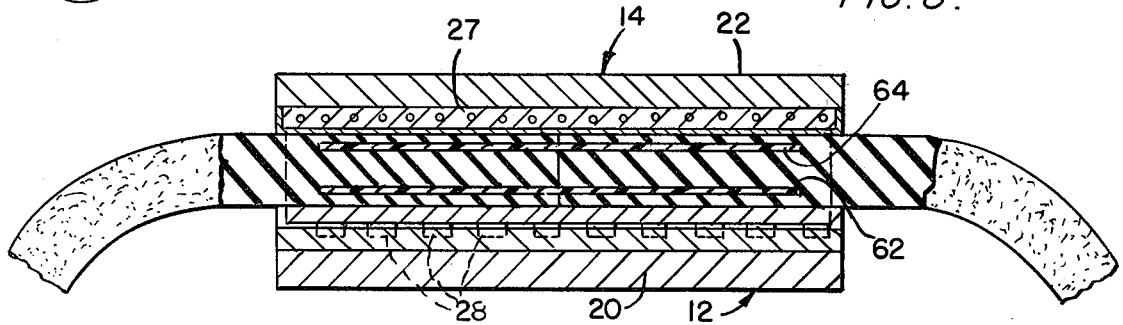
FIG. 8 is a view in longitudinal section of the V-belt splicing and vulcanizing machine taken along line 8—8 of FIG. 7.

As best seen in FIG. 8, after the splice elements 62, 64 have been inserted in the two abutting free ends of the V-belt as just described, and with strap member 70 also secured to the two ends of the V-belt loop, the V-belt loop is positioned in belt channel 26 which, at this time, should already be positioned in engagement with guide members 24A, 24B of the base member 20 of the lower portion of machine 10.

To begin the vulcanizing operation, the cover or head member 22 of the splicing and vulcanizing machine is closed into covering relation to the base portion 20 and to the abutting free ends of the V-belt positioned in belt channel 26. The heat provided by the heating elements in belt channel 26 and in cover member 22 serves to vulcanize the two free ends of the V-belt with the splice elements 62, 64 therebetween, and with the strap member 70 secured thereto. The amount of the heat provided for the vulcanizing operation and the length of the vulcanizing operation are so adjusted as to provide the necessary vulcanization to provide a strong joint between the two spliced ends of the V-belt. The rubberized bonding material which is carried by the nylon fiber or the like of the splice elements 62, 64 bonds in a very satisfactory manner to the rubber-like material of the V-belt, and strap member 70 also becomes bonded to the V-belt. The various features just described provide a satisfactory splicing and bonding operation between the two spliced ends of the V-belt with respect to each other and with respect to each other and with trespect to the splice elements 62, 64 and strap element 70 which bridge the two ends of the V-belt at the splice region.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

What is claimed is:

1. An apparatus for making V-belts comprising a base member, a cover for said base member, said cover being mounted on said apparatus for movement selectively into closing or opening relation to said base member, a guide means carried by said base member for receiving a length of belting from a supply, first means cooperating with said guide means for receiving and guiding cutting means to cut a predetermined length of said belting required for forming a closed loop of said belting, second means cooperating with said guide means for receiving and guiding a cutting means in making a slot in each free end of said belting for receiving a web-like splice element adapted to bridge the free ends of said predetermined length of belting to form said loop, and heating means carried by said apparatus for vulcanizing the free ends of said predetermined length to form a splice between said free ends.

2. An apparatus as defined in claim 1 in which said guide means carried by said base member is a channel member contoured to receive a length of V-belt, said channel member comprising a base portion and laterally spaced side walls upstanding from said base portion.

3. An apparatus as defined in claim 2 in which said channel member is detachably secured to said base member.

4. An apparatus as defined in claim 2 in which channel members of different cross-sectional contours are interchangeably detachably secured to said base member for receiving lengths of V-belting of different transverse cross-sectional areas.

5. An apparatus as defined in claim 2 in which said first means cooperating with said guide means for guiding a cutting means comprises a pair of slots in opposite side walls of said channel member, said slots being aligned with each other and lying in a plane transverse of the longitudinal axis of said channel, whereby a cutting means is receivable in said aligned slots to transversely cut a length of belting lying in said channel to cut said predetermined length of said belting.

6. An apparatus as defined in claim 2 in which said second means cooperating with said guide means in making a slot in each end of said belting comprises a pair of slots including a first slot and a second slot, said first slot and said second slot lying in respective opposite sidewalls of said channel and in a common plane with each other, said first slot and said second slot extending in a lengthwise direction of said channel and inwardly from a common end of said channel, whereby with a length of said V-belt in said channel a cutting means is receivable in said first slot and said second slot to make a slot in the end of said V-belt to receive a web-like splice element.

7. An apparatus as defined in claim 6 comprising a second pair of slots extending lengthwise of said channel from said common end, each slot of said second pair lying in a common plane with each other at a different height with respect to the vertical dimension of said sidewalls of said channel than the height of the common plane of said first pair of slots, said slots of said second pair lying in respective opposite walls of said channel, whereby with a length of V-belt in said channel, said cutting means is receivable in said slots of said second pair to make a second slot in the end of said V-belt to receive a second web-like splice element.

8. An apparatus as defined in claim 7 in which said electrical heating means comprises electrical heating elements in said channel member and in said cover.

9. An apparatus for making V-belts as defined in claim 2 which is electrically energized and comprises electrical heating means for providing heat for vulcanizing the spliced ends of the V-belt.

10. An apparatus as defined in claim 2 comprising electrical heating means carried by said channel member for vulcanizing the spliced ends of the V-belt, said apparatus being adapted to be connected to a source of electrical power to electrically energize said heating means, and cooperating electrical contact means carried by said base member and by said channel member to connect the electric power to said electrical heating means carried by said channel member.

11. An apparatus as defined in claim 1 comprising a support arm secured to said base member and a second support arm secured to said cover, and hinge means connecting said first and second support arms to each other whereby to mount said cover for movement selectively into closing or opening relation to said base member.

12. The method of making a V-belt loop from a length of V-belting which comprises the steps of:
 (1) measuring a predetermined required length of V-belting from a supply of V-belting, said belting including a substantial content of rubber-like material;
 (2) cutting the V-belting to separate the required predetermined length of belting from the supply of V-belting;
 (3) making a slot in each free end of said predetermined length of belting, each of said slots extending inwardly of said predetermined length in a lengthwise direction from the corresponding free end of said predetermined length, whereby to provide a slot in each of said free ends;
 (4) positioning a web-like splice element in the oppositely-disposed slots of the two ends of said predetermined length of belting, with said two free ends being in substantially abutting relation to each other and with said splice element being in bridging relation to said ends of said belting; and
 (5) vulcanizing the region of said belting comprising said abutting ends and said splice element, whereby to provide a strong and secure spliced joint between said two ends of said predetermined length.

13. The method defined in claim 12 in which said web-like splice element has a content of rubber-like material whereby to promote bonding between said splice element and said free ends of said belting during the vulcanizing step.

14. The method defined in claim 12 which comprises the step of making a plurality of slots in each free end of said belting, the slots of said plurality being vertically spaced with respect to each other, and positioning a separate web-like splice element in each pair of corresponding oppositely-disposed slots in the two ends of said predetermined length of belting.

15. The method of making a V-belt loop as defined in claim 12 which includes the additional step of securing to an outer surface of said abutting ends prior to the vulcanizing step a strap member which extends in the lengthwise direction of the belting and in bridging relation to said abutting ends, and with fastening means securing said strap member to said abutting ends, said fastening means extending into said belting and through the portions of said web-like splice elements in each of said abutting ends.

16. The method of making a V-belt loop as defined in claim 15 in which said strap member is made of nylon.

* * * * *